(12) United States Patent
Taylor et al.

(10) Patent No.: US 10,702,799 B2
(45) Date of Patent: Jul. 7, 2020

(54) SYSTEMS AND METHODS FOR ENHANCED SEPARATION OF HYDROGEN SULFIDE AND AMMONIA IN A HYDROGEN SULFIDE STRIPPER

(71) Applicant: Bechtel Hydrocarbon Technology Solutions, Inc., Houston, TX (US)

(72) Inventors: Martin Taylor, Houston, TX (US); Charles Kimtantas, Sugar Land, TX (US)

(73) Assignee: Bechtel Hydrocarbon Technology Solutions, Inc., Houston, TX (US)

( * ) Notice: Subject to any disclaimer, the term of this patent is extended or adjusted under 35 U.S.C. 154(b) by 134 days.

(21) Appl. No.: 16/012,261

(22) Filed: Jun. 19, 2018

(65) Prior Publication Data

US 2018/0296944 A1   Oct. 18, 2018

Related U.S. Application Data

(62) Division of application No. 15/123,546, filed as application No. PCT/US2015/019009 on Mar. 5, 2015, now Pat. No. 10,022,650.

(60) Provisional application No. 61/948,118, filed on Mar. 5, 2014.

(51) Int. Cl.
| | |
|---|---|
| *B01D 19/00* | (2006.01) |
| *B01D 53/14* | (2006.01) |
| *C01C 1/12* | (2006.01) |
| *C02F 1/20* | (2006.01) |
| *C02F 101/16* | (2006.01) |
| *C02F 101/10* | (2006.01) |
| *C02F 103/36* | (2006.01) |

(52) U.S. Cl.
CPC ..... *B01D 19/0015* (2013.01); *B01D 53/1425* (2013.01); *C01C 1/12* (2013.01); *C02F 1/20* (2013.01); *C02F 2101/101* (2013.01); *C02F 2101/16* (2013.01); *C02F 2103/365* (2013.01)

(58) Field of Classification Search
CPC .......... B01D 19/0015; B01D 53/1425; B01D 53/1468; C01C 1/12; C02F 1/20; C02F 2101/101; C02F 2101/16; C02F 2103/365
See application file for complete search history.

(56) References Cited

U.S. PATENT DOCUMENTS 5,368,754 A * 11/1994  Von Klock ............. B01D 53/04
                                                              203/41
2005/0139546 A1    6/2005  Burke
(Continued)

FOREIGN PATENT DOCUMENTS

| CN | 101522288 A | 9/2009 |
|---|---|---|
| CN | 102844275 A | 1/2011 |

(Continued)

OTHER PUBLICATIONS

J Van Ganswijk, Communication Pursuant to Article 94(3) EPC, European Patent Application No. 15758346.9, Mar. 13, 2019, 5 pages, European Patent Office, Netherlands.

(Continued)

*Primary Examiner* — Cabrena Holecek
(74) *Attorney, Agent, or Firm* — Crain, Caton and James

(57) ABSTRACT

Systems and methods for enhanced separation of H2S and NH3 in an H2S stripper using carbon dioxide and/or an inert gas.

7 Claims, 3 Drawing Sheets

(56) References Cited

U.S. PATENT DOCUMENTS

| | | | | |
|---|---|---|---|---|
| 2013/0247766 | A1* | 9/2013 | Oppenheim | B01D 53/52 96/234 |
| 2017/0021304 | A1* | 1/2017 | Wei | B01D 53/1493 |
| 2017/0072338 | A1* | 3/2017 | Taylor | C01C 1/12 |

FOREIGN PATENT DOCUMENTS

| | | |
|---|---|---|
| CN | 101981022 A | 2/2011 |
| DE | 4238289 | 5/1994 |
| GB | 1471195 | 4/1997 |

OTHER PUBLICATIONS

Andrew Wells, Response to Communication, European Patent Application No. 15758346.9, dated Jul. 16, 2019, 11 pages, HGF Limited, Manchester, UK.

Nur Mazlin Binti Mohamad Khir, Substantive Examination Adverse Report, Malaysian Patent Application No. PI2016001594, dated Mar. 26, 2019, 4 pages, Intellectual Property Corporation of Malaysia, Kuala Lumpur, Malaysia.

Soo Ee Lin, Response to Substantive Examination, Malaysian Patent Application No. PI2016001594, dated May 23, 2019, 5 pages, Sruson & Ferguson Intellectual Property, Kuala Lumpur, Malaysia.

Svetlana V. Novoselova, Response to Office Action, Eurasian Patent Application No. 201694564/31, dated May 30, 2019, 12 pages, ARS-Patent, Russia.

Dian Nurfitri, S.SI, Substantive Examination Report, Indonesian Patent Application No. P00201605894, dated May 29, 2019, 2 pages, Ministry of Justice and Human Rights of the Republic of Indonesia Directorate General of Intellectual Property Rights, South Jakarta, Indonesia.

Dora Am Badar, S.PSI, Response to Examination Report, Indonesian Patent Application No. P00201605894, dated Jul. 15, 2019, 3 pages, AM Badar & Partners, Indonesia.

Mexican Patent Office, Office Action, Mexican Patent Application No. Mx/a/2016/011397, dated Jul. 30, 2019, 2 pages, Mexican Patent Office, Mexico.

Ing Engenio Perez Perez, Response to Office Action, Mexican Patent Application No. Mx/a/2016/011397, dated Sep. 9, 2019, 4 pages, Uhthoff Gomez Vega & Uhthoff, Mexico.

Beyond Attorneys at Law, Response to First Office Action, Chinese Patent Application No. 201580011778.5, dated Jan. 14, 2019, 5 pages, Beyond Attorneys at Law, Beijing China.

Tarun Gandhi, Response to First Examination Report, Indian Patent Application No. 201627029388, dated Jan. 8, 2019, 30 pages, Chadha and Chadha, New Delhi, India.

Adams and Adams, Application to Amend a Complete Specification, South African Patent Application No. 2016/06069, dated Jan. 24, 2019, 13 pages, Adams and Adams, South Africa, Pretoria.

A.V. Gutman, Conclusion on Patentability of the Invention, Eurasian Patent Application No. 201691564/31, Jan. 30, 2019, 2 pages.

D.C. Kang, Notice to File a Response, Korean Patent Application No. 10-2016-7027498, dated May 21, 2018, 8 pages, Korean Intellectual Property Office, Korea.

Ms Young-Joo Youn, Argument-Response to Office Action, Korean Patent Application No. 10-2016-7027498, dated Jun. 25, 2018, 14 pages, Nam & Nam, Korea.

A.V. Gutman, Notification of necessity of submitting additional materials, Eurasian Patent Application No. 201691564/31, Jun. 20, 2018, 2 pages, Eurasian Patent Organization, Russia.

Kuan Li, Notification of the First Office Action, Chinese Patent Application No. 201580011778.5, dated Aug. 28, 2018, 10 pages, State Intellectual Property Office of People's Republic of China, China.

Dr Umesh Ch Pandey, Examination Report, Indian Patent Application No. 201627029388, dated Sep. 24, 2018, 7 pages, Intellectual Property India-Government of India, Inida.

Svetlana V. Novoselova, Response to Office Action, Eurasian Patent Application No. 201691546, dated Oct. 10, 2018, 4 pages, ARS-Patent, Russia.

Kuan Li, Third Office Action, Application No. 201580011778.5, dated Oct. 16, 2019, 6 pages, China National Intellectual Property Administration, China.

Beyond Attorneys at Law, Response to Third Office Action, Application No. 201580011778.5, dated Dec. 31, 2019, 4 pages, Beyond Attorneys at Law, China.

Beyond Attorneys at Law, Supplementary Respose to 3rd Office Action, Application No. 201580011778.5, dated Jan. 21, 2020, 3 pages, Beyond Attorneys at Law, China.

Ing. Eugenio Perez Perez, Response to Office Action, Mexican Application No. Mx/a/2016/0011397, dated Nov. 13, 2019, 2 pages, Uhthoff Gomez Vega & Uhthoff, Mexico.

Svetlana V. Novoselova, Response to Office Action, Eurasian Application No. 201691564/31, dated Dec. 6, 2019, 8 pages, ARS-Patent, Russia.

Mexican Patent Office, Fourth Office Action, Mexican Application No. Mx/a/2016/011397, dated Dec. 4, 2019, 2 pages, Mexican Patent Office, Mexico.

Lic. Francisco Javier Uhthoff Orive, Response to Fourth Office Action, Mexican Application No. Mx/a/2016/011397, dated Jan. 10, 2020, 3 pages, Uhthoff Gomez Vega & Uhthoff, Mexico.

* cited by examiner

SYSTEMS AND METHODS FOR ENHANCED SEPARATION OF HYDROGEN SULFIDE AND AMMONIA IN A HYDROGEN SULFIDE STRIPPER

CROSS-REFERENCE TO RELATED APPLICATIONS

This Application is a division of U.S. patent application Ser. No. 15/123,546, filed on Sep. 2, 2016, which is a U.S. National Phase Application of PCT Patent Application Serial No. PCT/US15/19009, filed on Mar. 5, 2015, which claims priority from U.S. Provisional Patent Application Ser. No. 61/948,118, filed on Mar. 5, 2014, which are incorporated herein by reference.

STATEMENT REGARDING FEDERALLY SPONSORED RESEARCH

Not applicable.

FIELD OF THE INVENTION

The present invention generally relates to systems and methods for enhanced separation of hydrogen sulfide ($H_2S$) and ammonia ($NH_3$) in an $H_2S$ stripper. More particularly, the present invention relates to enhanced separation of $H_2S$ and $NH_3$ in an $H_2S$ stripper using carbon dioxide and/or an inert gas.

BACKGROUND OF THE INVENTION

Conventional technology separately recovers $H_2S$ and $NH_3$ from sour water using an $H_2S$ stripper and an $NH_3$ stripper, which is sometimes referred to as a two-column sour water stripping process. This process yields acid gas ($H_2S$) with less than 50 ppmw $NH_3$ and a high purity gaseous or liquid $NH_3$ product. The separated water is of excellent quality, making it suitable for reuse as coke drum quench water, crude unit desalter water, and hydro-processing unit injection water or it may be sent to effluent treating for discharge.

A two-column sour water stripping process typically includes four main processing stages: 1) degassing and feed preparation; 2) $H_2S$ stripping; 3) $NH_3$ stripping; and 4) $NH_3$ purification and liquefaction. Referring now to FIGS. 1A and 1B, a schematic diagram of a conventional two-column sour water stripping system 100 illustrates the four processing stages. The following pressures and temperatures are exemplary and only for purposes of illustration.

Degassing and Feed Preparation:

Sour water feeds 102 from a single or several sources are combined with a recycle stream 104 from the $NH_3$ stripper 106, which are cooled and passed through a degasser 108 where dissolved hydrogen ($H_2$), methane ($CH_4$) and other light hydrocarbons are removed as a hydrocarbon vapor stream 105. The sour water feeds 102 include dissolved $NH_3$ and $H_2S$. The recycle stream 104 includes rich $NH_3$, which helps keep acid gases in solution in the degasser 108, thereby minimizing the release of acid gas and possible air pollution. The degassed sour water stream 109 is sent to a deoiler 103, which removes free oil from the degassed sour water stream 109 to produce a degassed/deoiled sour water stream 107. The degassed/deoiled sour water stream 107 is pumped to a feed preparation tank 110, which serves to attenuate flow rate and composition changes while also providing the opportunity to remove entrained oil and solids. The feed preparation tank 110 produces a processed sour water stream 111, which is pumped to a feed coalescer unit 112 that filters solids remaining in the processed sour water stream 111 and further separates entrained oil to produce a hydrocarbon liquid 113 and a deoiled sour water stream 115. The deoiled sour water stream 115 is sent to a feed/product exchanger 114, which acts as a heat exchanger to heat the deoiled sour water stream 115 and cool the $NH_3$ stripper bottoms stream 132 to produce a heated deoiled sour water stream 116 and the stripped water stream 134. In this manner, the components comprising the $NH_3$ stripper bottoms stream 132, stripped water stream 134 and the components comprising the deoiled sour water stream 115, heated deoiled sour water stream 116 are, respectively, the same but may have different concentrations and temperatures. The heated deoiled sour water stream 116 is then sent to an $H_2S$ stripper 118.

$H_2S$ Stripping:

The $H_2S$ stripper 118 contains trays or packing (not shown) that the heated deoiled sour water stream 116 flows through and around to separate $H_2S$ from the heated deoiled sour water stream 116. A cooled reflux water stream (e.g. water wash) 136 is used remove heat and suppress evolution of gaseous $NH_3$ in the $H_2S$ stripper. A reboiler 137 acts as a heat exchanger to provide the energy required to i) heat the heated deoiled sour water stream 116 and the cooled reflux water stream 136 to a preferred temperature; and ii) strip out $H_2S$ from the heated deoiled sour water stream 116. The resulting $H_2S$ stripper overheads stream 120 is sent to a knock out drum 138 to substantially remove any entrained droplets and produce $H_2S$ stream 126. The $H_2S$ stream 126 is of high purity and is an excellent feed for a sulfur recovery unit (SRU) or a sulfuric acid plant. It contains a negligible amount of $NH_3$ (less than 50 ppmw) and very little hydrocarbons since the sour water feeds 102 have been degassed. The $H_2S$ stream 126 is available at about 100-180 psig and 100-120° F. The resulting $H_2S$ stripper bottoms stream 130, which contains $NH_3$ and some $H_2S$, is sent directly to the $NH_3$ stripper 106.

$NH_3$ Stripping:

The $NH_3$ stripper 106 is a steam re-boiled, refluxed distillation column. In the $NH_3$ stripper 106, essentially all $NH_3$ and any remaining $H_2S$ are removed from the $H_2S$ stripper bottoms stream 130, which leaves the $NH_3$ stripper 106 as an $NH_3$ stripper bottoms stream 132. The $NH_3$ stripper bottoms stream 132 is sent to the feed/product exchanger 114 where heat is exchanged with the deoiled sour water stream 115 and the $NH_3$ stripper bottoms stream 132 is cooled to form the stripped water stream 134. The stripped water stream 134 is suitable for many plant reuse needs or may be discharged. The containment levels of $H_2S$ and $NH_3$ in the stripped water stream 134 may be tailored to individual requirements and is typically 10-50 ppmw $NH_3$ and 1-25 ppmw $H_2S$. The stripped water stream 134 is available at about 100-200° F. In the $NH_3$ stripper 106, essentially all $NH_3$ and any remaining $H_2S$ are removed from the $H_2S$ stripper bottoms stream 130, which leaves the $NH_3$ stripper 106 as an $NH_3$ stripper overheads stream 133. The $NH_3$ stripper overheads stream 133 is sent to an overhead condenser where it is converted to an $NH_3$ vapor stream and an $NH_3$ liquid stream. A knock out drum 139 separates the $NH_3$ vapor stream 140 and the $NH_3$ liquid stream 150. A portion of the $NH_3$ liquid stream 150 is returned as reflux to the $NH_3$ stripper 106 and another portion of the $NH_3$ liquid stream 150 forms the recycle stream 104. A reboiler 141 acts as a heat exchanger to provide the energy required to remove $NH_3$ and any remaining H2S. The NH3 vapor stream 140 is an NH3-rich gas, which may be processed in a variety of ways.

NH3 Purification and Liquefaction:

Referring now to FIG. 1B, the NH3 vapor stream 140 is sent to a water wash 142 to remove residual amounts of H2S and some hydrocarbons. This step is also referred to as water scrubbing, which produces a scrubbed NH3 vapor stream 160. If NH3 recovery is not desired or economic, the scrubbed NH3 vapor stream 160 may be incinerated. In most cases, however, it is desirable to further purify the scrubbed NH3 vapor stream 160 to produce either anhydrous liquid NH3 170 or aqueous NH3 180 suitable for commercial use. In order to further purify the scrubbed NH3 vapor stream 160, the scrubbed NH3 vapor stream 160 is sent to a caustic wash 144 to remove residual contaminants including some hydrocarbons. This step is also referred to as caustic scrubbing, which produces a double scrubbed NH3 vapor stream 162 and may be necessary when problems are expected with process upsets, carbon dioxide, or complex sulfur compounds (e.g. mercaptans or disulfides). The double scrubbed NH3 vapor stream 162 may be sent to either a compressor 146 or a refrigeration unit 148 to produce the anhydrous liquid NH3 170, which contains a negligible amount of H2S (less than 5 ppmw). The anhydrous liquid NH3 170 is available at about 200 psig and 100° F. if liquefied by compression and at atmospheric pressure and about –26 F if liquefied by cooling. Cooling water and/or a refrigerant may be used to exchange heat with the compressed double scrubbed NH3 vapor stream 162. The double scrubbed NH3 vapor stream 162 may also be sent to an NH3 absorber 149, which is essentially another water wash, to produce the aqueous NH3 180, which contains a negligible amount of sulfur (no more than about 2 ppmw). The aqueous NH3 180 is available at about 35 psig and 100° F.

SUMMARY OF THE INVENTION

The present invention overcomes one or more of the prior art disadvantages by providing systems and methods for enhanced separation of H2S and NH3 in an H2S stripper using carbon dioxide and/or an inert gas.

In one embodiment, the present invention includes a system for separating hydrogen sulfide and ammonia, which comprises: i) a hydrogen sulfide stripper for separating most of the hydrogen sulfide from the ammonia; and ii) a stripping gas stream connected to the hydrogen sulfide stripper by a stripping gas stream line, wherein the stripping gas stream comprises only a carbon dioxide and an inert gas selected from the group consisting of Helium, Neon, Argon, Krypton, Xenon and Radon.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like numerals and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied in other industries to achieve similar results.

The present invention provides systems and methods to enhance the separation of H2S and NH3 in an H2S stripper using carbon dioxide and/or an inert gas. The purpose of the carbon dioxide and/or an inert gas, also referred to as a stripping gas, is to enhance the separation of H2S and NH3 during the H2S stripping stage by i) lowering the partial pressure of H2S; and ii) providing a stripping action.

Figure 1A:
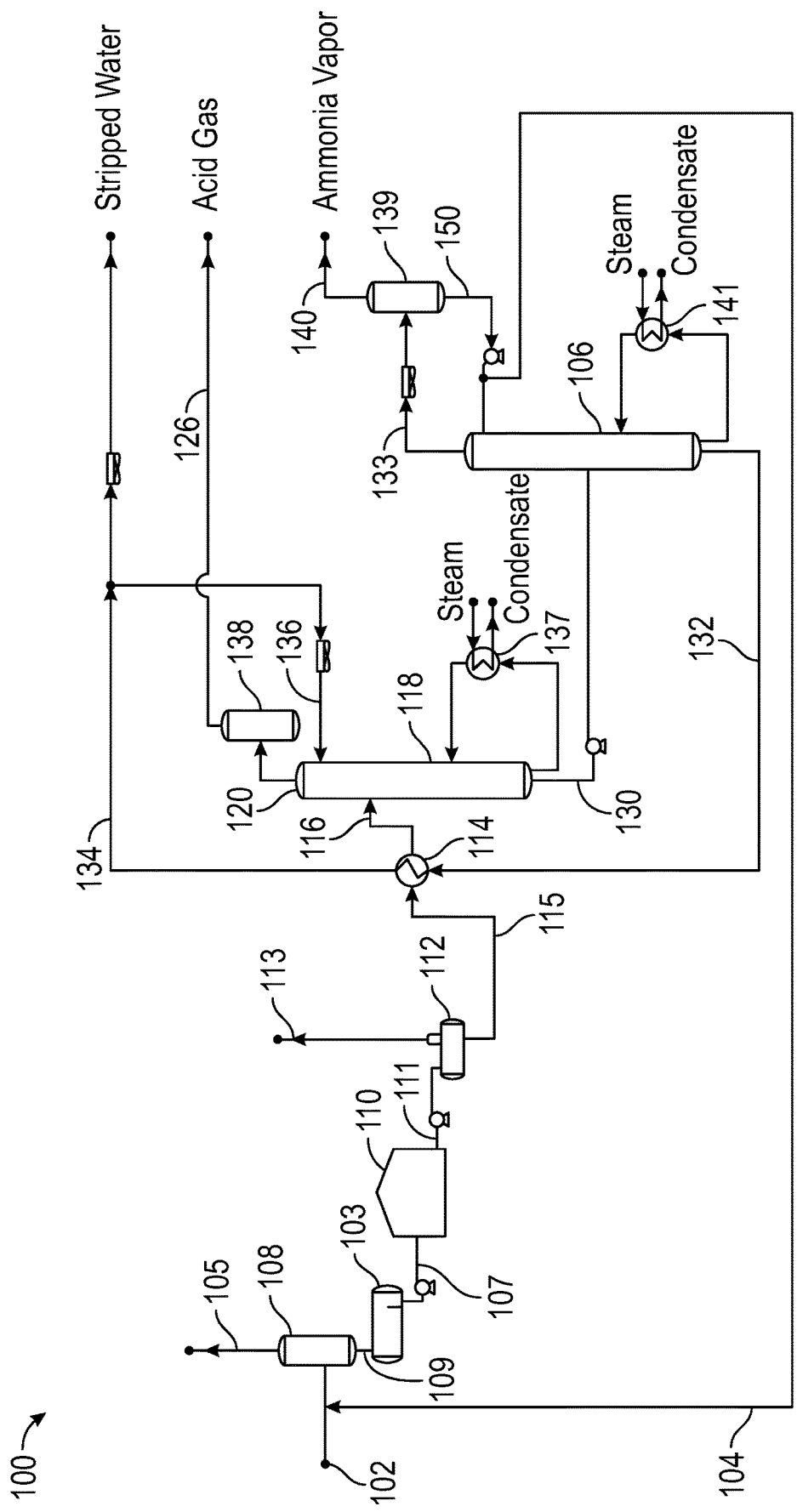
FIGS. 1A-1B are schematic diagrams illustrating a conventional two-column sour water stripping system.
Figure 1B:
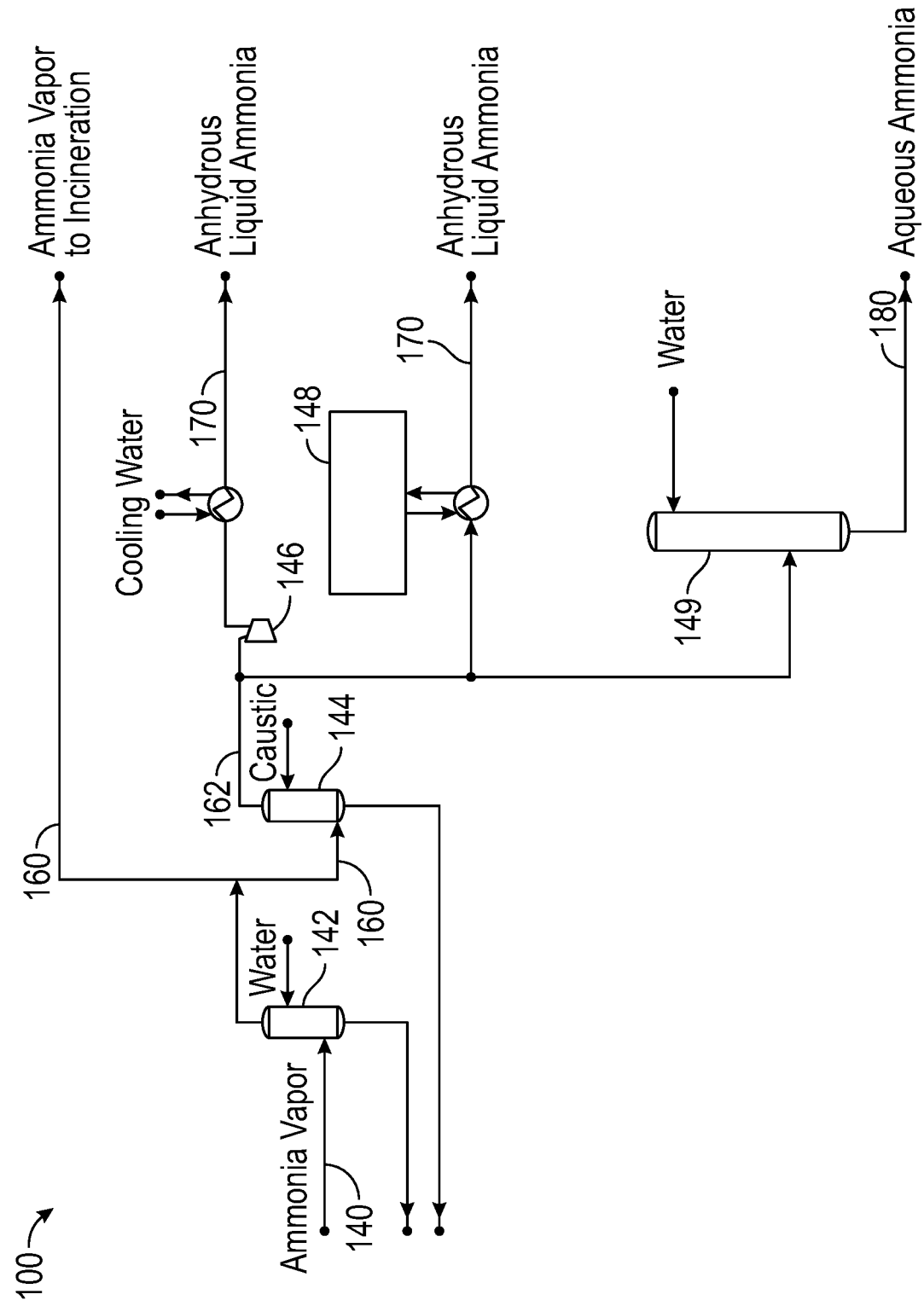
Figure 2:
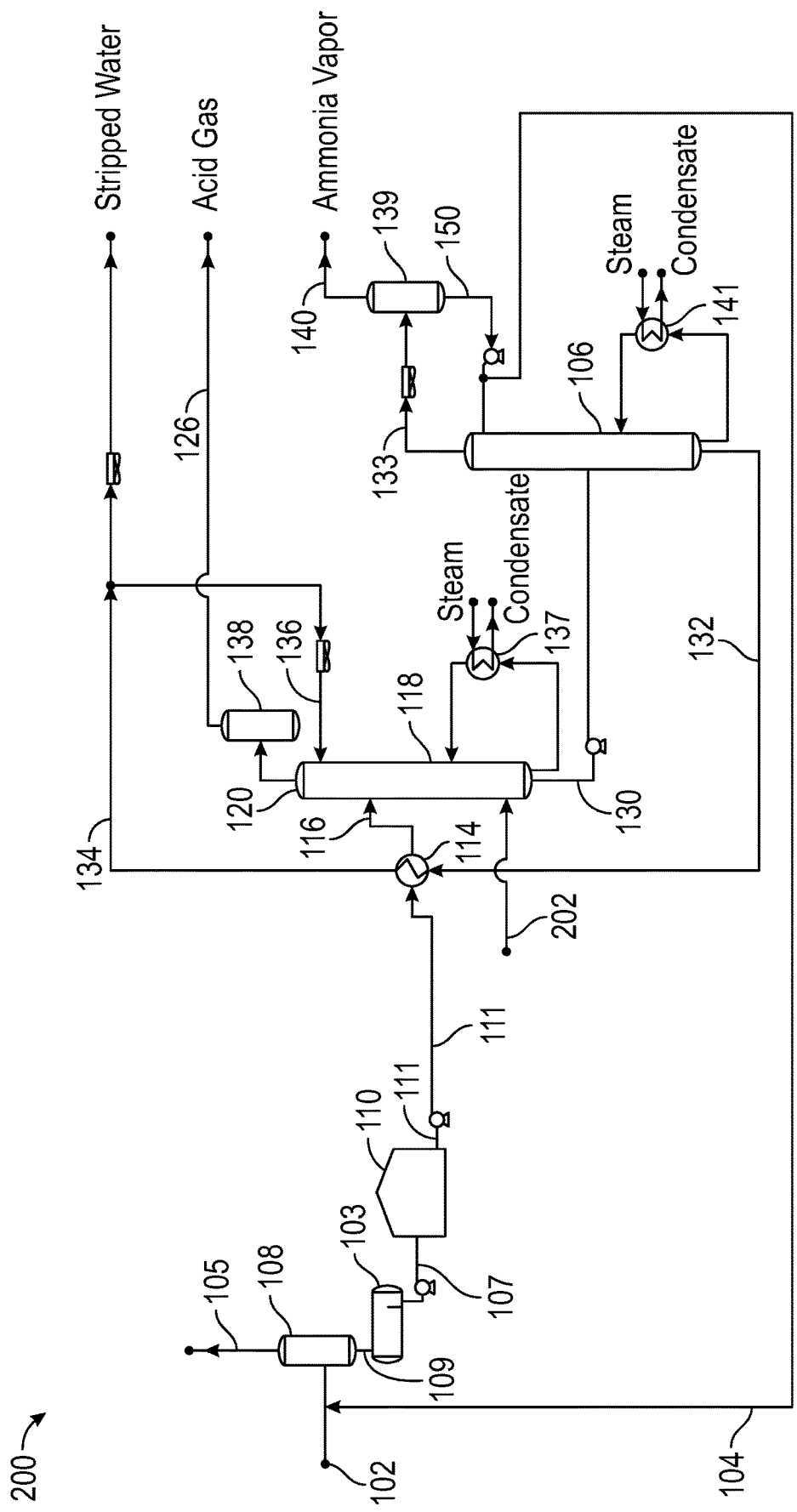
FIG. 2 is a schematic diagram illustrating the 1-12S stripping stage in FIG. 1A according to the present invention.

Referring now to FIG. 2, a schematic diagram illustrates the H2S stripping stage in FIG. 1A for a modified system 200 that uses a stripping gas stream 202 to enhance the separation of H2S and NH3 in the H2S stripper 118. This stage can consist of various pieces of equipment depending upon the ultimate concentration and quality of NH3 desired. The stripping gas stream 202 may be introduced anywhere between the top and bottom of the H2S stripper 118. Preferably, however, the stripping gas stream 202 is introduced near the bottom of the H2S stripper 118 because it will contact more of the heated deoiled sour water stream 116. In this manner, any conventional two-column sour water stripping system that includes a H2S stripping stage may be easily retrofitted with the introduction of a stripping gas.

The stripping gas stream 202 may include carbon dioxide and/or any inert gas, which is a gas that does not react with other constituents of the H2S stripper 118 or sour water stripper such as, for example, Hydrogen, Helium, Boron, Neon, Argon, Krypton, Xenon, Radon, diatomic nitrogen, methane, and ethane.

In the operation of a two-column sour water stripping system with an H2S stripping stage that includes a stripping gas stream 202 comprising carbon dioxide, the separation of the H2S and NH3 may be improved by at least five percent. By enhancing the separation of H2S and NH3 in this manner, the consumption of utilities (e.g. reboiler heating media) in the two-column sour water stripping system will be lowered resulting in energy savings or performance may be improved with the same utility consumption.

Conventional two-column sour water stripping systems have been around since the 1960's. While operators of such systems have recognized the need for enhanced separation of H2S and NH3, the characteristics of carbon dioxide are similar to those of an acid gas. This explains why the need for enhanced separation of H2S and NH3 using carbon dioxide in the H2S stripping stage of a two-column sour water stripping system, with another acid gas (H2S), has been unresolved since the 1960's.

The invention claimed is:

1. A system for separating hydrogen sulfide and ammonia, which comprises:

a hydrogen sulfide stripper for separating most of the hydrogen sulfide from the ammonia; and a stripping gas stream connected to the hydrogen sulfide stripper by a stripping gas stream line, wherein the stripping gas stream comprises only a carbon dioxide and an inert gas selected from the group consisting of Helium, Neon, Argon, Krypton, Xenon and Radon.

2. The system of claim 1, wherein the stripping gas stream is connected to the hydrogen sulfide stripper by the stripping gas stream line near a bottom of the hydrogen sulfide stripper.

3. The system of claim 1, wherein the stripping gas stream comprises equal amounts of the carbon dioxide and the inert gas.

4. The system of claim 1, wherein the stripping gas stream comprises more of the carbon dioxide than the inert gas.

5. The system of claim 1, wherein the stripping gas stream comprises more of the inert gas than the carbon dioxide.

6. The system of claim 1, wherein the hydrogen sulfide stripper contains a fluid mixture of the hydrogen sulfide and the ammonia.

7. The system of claim 1, further comprising a hydrogen sulfide stripper overheads stream connected to a top of the hydrogen sulfide stripper by a hydrogen sulfide stripper overheads stream line and a hydrogen sulfide stripper bottoms stream connected to a bottom of the hydrogen sulfide stripper by a hydrogen sulfide stripper bottoms stream line, the hydrogen sulfide stripper overheads stream comprising hydrogen sulfide, water, and is substantially ammonia free, and the hydrogen sulfide stripper bottoms stream comprising water, ammonia, and hydrogen sulfide.

* * * * *